Figure 1:
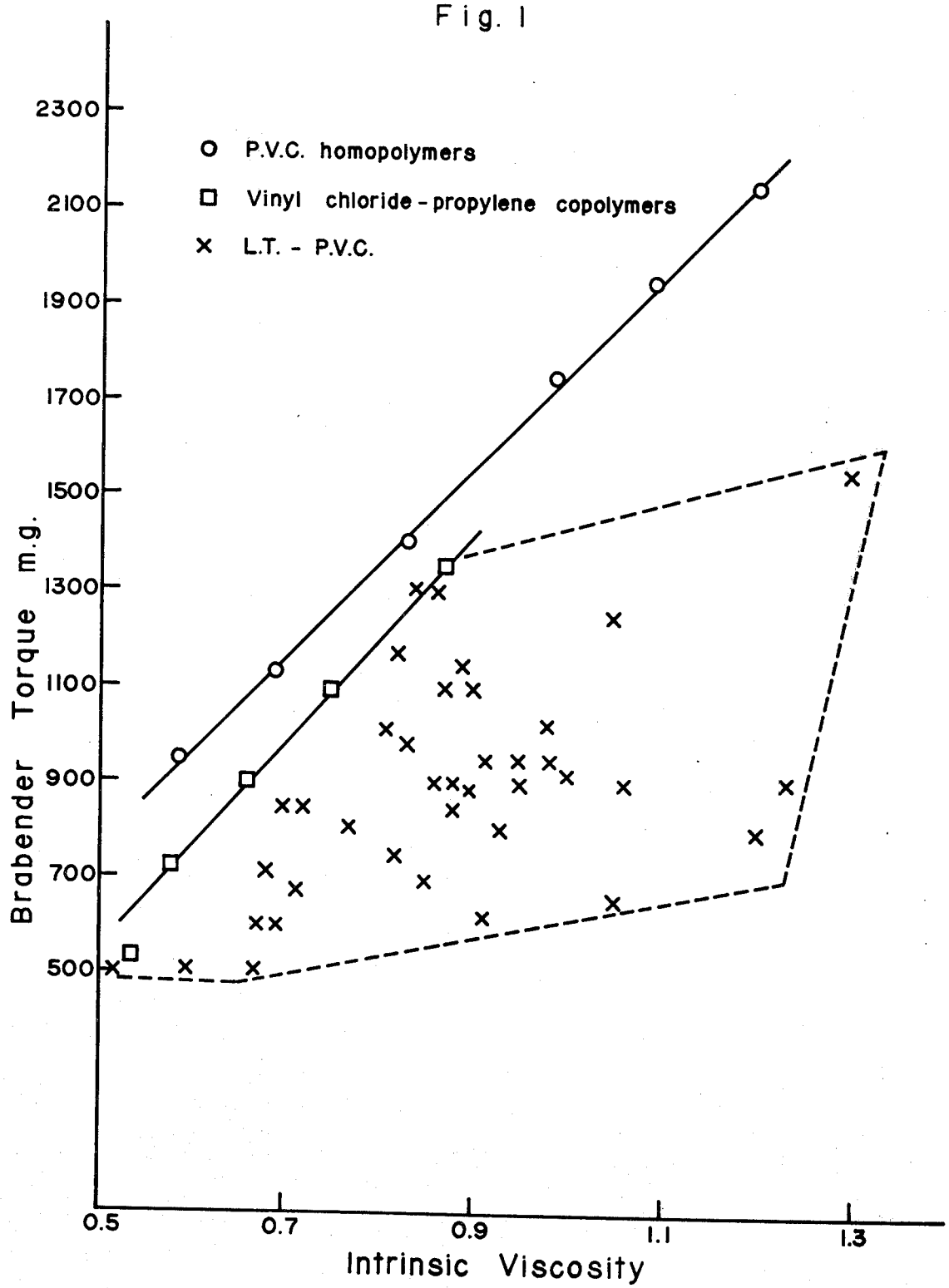

United States Patent [19]

Ravey et al.

[11] 4,072,806

[45] Feb. 7, 1978

[54] NOVEL VINYL CHLORIDE POLYMERS AND PROCESS FOR THEIR PRODUCTION

[75] Inventors: Mani Ravey; Leonard Marshall Shorr, both of Haifa, Israel; Jacques A. Waterman, deceased, late of Haifa, Israel, by Jacob Frankel, administrator

[73] Assignee: IMI (TAMI) Institut for Research and Development, Haifa, Israel

[21] Appl. No.: 660,250

[22] Filed: Feb. 23, 1976

[30] Foreign Application Priority Data

Feb. 21, 1975   Israel ........................................ 46681

[51] Int. Cl.$^2$ ............................................. C08F 14/06
[52] U.S. Cl. ............................... 526/89; 260/77.5 R; 526/206; 526/208; 526/224; 526/261; 526/303; 526/322; 526/327; 526/345
[58] Field of Search ..................... 260/77.5 R; 526/89, 526/206, 208, 224, 234–261, 322, 327, 345

[56] References Cited

U.S. PATENT DOCUMENTS

| | | | |
|---|---|---|---|
| 2,510,503 | 6/1950 | Kropa ................................... | 526/261 |
| 3,068,210 | 12/1962 | Douglas ............................... | 526/322 |
| 3,404,113 | 10/1968 | Lindemann et al. ................. | 526/261 |
| 3,637,619 | 1/1972 | Mazzolini et al. .................... | 526/224 |
| 3,812,086 | 5/1974 | Stack ...................................... | 526/89 |
| 3,878,180 | 4/1975 | Holder et al. ......................... | 526/224 |
| 3,979,366 | 9/1976 | Schwab ................................. | 526/345 |

*Primary Examiner*—Harry Wong, Jr.
*Attorney, Agent, or Firm*—Millen & White

[57] ABSTRACT

The novel polymers are prepared from a charge containing the following ingredients:

(a) vinyl chloride;
(b) from 50 ppm to 1% by weight of the total charge of at least one branching agent selected from the group of vinylic and allylic esters and amides and having at least two polymerizable double bonds in the molecule, in which branching agent the vinylic and allylic groups are linked directly the ester oxygen or amide atom, nitrogen respectively, as the case may be;
(c) from 500 ppm to 5% by weight of the total charge of at least one chain transfer agent selected from the group consisting of unsubstituted and substituted aliphatic aldehydes, $C_1$ and $C_2$ halogenated hydrocarbons containing 3 or 4 atoms of chlorine or bromine in the molecule, sulfides and mercaptans;
(d) at least one radical producing initiator.

This charge is subjected to polymerization and the resultant vinyl chloride polymer is recovered from the reaction.

13 Claims, 1 Drawing Figure

NOVEL VINYL CHLORIDE POLYMERS AND PROCESS FOR THEIR PRODUCTION

BACKGROUND OF THE INVENTION

This invention relates to novel polymers of vinyl chloride and their preparation by free radical initiated polymerization.

Vinyl chloride homopolymers are known to be rigid materials characterized by a substantial resistance to chemical attack. However, resinous compositions containing only homopolymers of vinyl chloride have poor flow characteristics and are of poor stability under dynamic processing conditions and, therefore, difficult to mold or to flux. Moreover, to overcome the relatively poor heat stability of vinyl chloride homopolymers, rigid resinous compositions thereof have to include stabilizing additives. Such additives, however, are not acceptable in all products, such as those which come in contact with food and pharmaceuticals.

Attempts to improve the processing characteristics of polyvinylchloride have involved the incorporation of so-called external plasticisers or the formation of poly blends, i.e. mixing the polymer with a plasticiser or with other polymers. However, none of these procedures is entirely satisfactory, be it because any improvement achieved was at the expense of sacrificing some other desirable physical properties, such as clarity, impact toughness, rigidity or chemical resistance, or be it because the products so obtained are economically unattractive for many applications because of the additional time consuming, post-polymerization formulation and compounding that are necessary.

In view of the above shortcomings of homopolymeric vinyl chlorides, attempts have been made to copolymerize vinyl chloride in order to obtain in this way products of better properties. In accordance with one proposal, vinyl chloride is copolymerized with propylene. Thus according to British Patent Specifications Nos. 1,096,887 and 1,096,889 vinyl chloride is copolymerized with up to 10% by weight and preferably 3-7% by weight of propylene and the products obtained are claimed to be rigid and to possess desirable processability. Similar products are also described by H. D. Deanin, "Vinyl Chloride-Propylene Copolymers", Society of Plastic Engineers, Vol. 23, May 1967, p. 50, who shows that on the one hand the molecular weight of the copolymer measured by the intrinsic viscosity depends inversely on the propylene content and, on the other hand, at a temperature of 65° C, which is often encountered in the polymerization techniques, no useful product with suitable molecular weight can be obtained with a propylene content higher than 5% by weight. Such a limitation of the relative proportion of the comonomer restricts however, a priori, the range of products that can be obtained in this way. In particular the flow under dynamic processing conditions of copolymers of low propylene content though better than that of vinyl chloride alone, is still too low for certain uses.

Furthermore, these vinyl chloride-propylene copolymers exhibit two disadvantages, both due to the characteristics of monomeric propylene which is a degradative chain transfer agent. As a direct result, not only are the molecular weights of the resulting copolymers lower than those of vinyl chloride homopolymers prepared under equivalent conditions, but the reaction rate is slowed down so that lower conversions are achieved. To raise the conversion the concentration of the initiator must be increased but this in turn has the disadvantage that the product contains higher concentrations of initiator residues which reduce its thermal stability. This then explains why the propylene content is to be kept low, as specified.

Some of the shortcomings of vinyl chloride homopolymers, and of the known copolymers thereof were overcome by the process described in our U.S. Pat. Nos. 3,763,123 and 3,806,496. U.S. Pat. No. 3,763,123 discloses interpolymers consisting of from 20-98% by weight of vinyl chloride; from 100 ppm to 5% by weight of at least one copolymerizable monomeric branching agent characterized (a) by having at least two polymerizable double bonds which may either be conjugated with each other or alternatively one of which may be in conjugation with another non-polymerizable double bond, and (b) by being asymmetrically substituted; and at least one further copolymerizable monomeric compound in amounts sufficient to make 100%, selected from the group consisting of propylene, isobutylene, 1-butene, methyl pentenes, amylenes and allyl halides. U.S. Pat. No. 3,806,496 discloses free radical initiated interpolymers comprising vinyl chloride, up to 20% by weight of at least one copolymerizable monomeric allylic hydrocarbon, and from 1 ppm to 5% by weight of at least one copolymerizable monomeric branching agent characterized by having two or more olefinic groups not in conjunction with each other. In accordance with both these patents propylene is the copolymerizable monomer of choice and the interpolymers thus obtained are distinguished from previously known vinyl chloride-propylene copolymers by their branching due to the additional presence of the branching agents. These interpolymers are generally superior to the previously known vinyl chloride-propylene copolymers. However, even these improved interpolymers according to our U.S. Pat. Nos. 3,763,123 and 3,806,496 still suffer from two of the disadvantages of the vinyl chloride-propylene copolymers viz : lowered heat distortion temperature (hereinafter HDT) and lowered polymerization rates, compared to the homopolymeric vinyl chloride (hereinafter PVC). For example, where an interpolymer according to either of these U.S. Patents contains about 3.5% by weight propylene, the HDT is lowered by about 10° C as compared to PVC. Similarly M.J.R. Cantow, C. W. Cline, C. A. Heiberger, D.Th.A. Huibers and R. Phillips in Modern plastics June 1969, p. 128, find that the glass transition temperature (hereinafter Tg), which is closely related to the HDT, of the vinyl chloride-propylene copolymer falls by 9° C per 1% propylene content. Similar effects are also reported in U.S. Pat. No. 3,501,440 for vinyl chloride-ethylene copolymers and vinyl chloride-ethylene-propylene terpolymers. In each and every one of these cases the improvement in processibility achieved was at the expense of the heat distortion temperature. Such reductions of HDT are significant and for many applications critical, limiting the use of the articles prepared from such materials. Moreover, although the vinyl chloride-propylene interpolymers prepared according to our U.S. Pat. Nos. 3,763,123 and 3,806,496 have higher molecular weights than the vinyl chloride-propylene, copolymers, reaction rates are the same for both, which means that in production of the interpolymers the conversion is as low as in the case of the copolymers.

That copolymerization, like branching, reduces the HDT is not unexpected. It is known from the literature that a branched structure of a polymer reduces the HDT as compared to a non-branched structure. Thus M. L. Miller in his book "The Structure of Polymers" published in 1966 by Reinhold Book Corporation, New York, states on P.131 that "branches make it harder for molecules to pack efficiently in amorphous solid as well as in crystals. Less good packing increases the free volume in a polymer and lowers the temperature at which it softens." On P.476 of the same book the author states the following: "Introduction of a comonomer into a polymer by random copolymerization disrupts the (attractive) interaction between like monomer units in the same molecules and interferes with interaction between molecules. Since the interactions between like monomer units are rarely equalled or surpassed by interactions between unlike monomer units, conventional copolymerization normally increases inter-molecular spacing and decreases densities. When, as often happens, the molecules of the two comonomers differ greatly in size and shape the efficiency of molecular packing in the copolymer is further decreased. As a result the copolymers are usually softer than the component homopolymers and have lower Tg's and higher brittle point."

Tg. is the glass-transition temperature which is related to the HDT as is also stated by Miller in his book on p.480.

Likewise G. Matthews in "Vinyl and Allied Polymers", London Iliffe Books, 1972, states in Vol. 2, p. 52 that vinyl chloride copolymers have lower softening points than the homopolymers of the same molecular weight and, under equivalent processing conditions, yield melts of lower viscosity. Thus for every percent vinyl acetate introduced, the softening temperature is likely to fall by 0.5° C.

Copolymers of vinyl chloride with both vinyl acetate and vinylidene chloride are discussed by J. V. Koleske and L. H. Wartman in "Polyvinyl Chloride", McDonald Technical and Scientific, London, 1969, p. 100 and they also state that such copolymers have a reduced softening and processing temperature.

Some further information on vinyl chloride copolymers is to be found in the chapter "Copolymers" by C. A. Brighton in "Encyclopedia of Polymer Science and Technology", Interscience Publishers, N.Y. 1971, Vol. 14, p. 350, 354. Thus it is stated there that vinyl chloride-ethylene copolymers have better processability than the homopolymers but this is gained at the expense of a lower HDT. The author further states that vinyl chloride-propylene copolymers of the type prepared by the Airco Company have deflection temperatures (according to the ASTM test No. D 648-56 at 264 psi) in the range of 68°–71° C whereas that of PVC ranges up to 80° C. The softening point of the copolymers of vinyl chloride with acrylate esters decrease with increasing ester content and with the length of the alcohol moity of the ester group.

It thus follows that copolymerization with or without branching reduces the HDT so that the desired effect of improving the flow characteristics and thereby the processibility of the vinylic resin is achieved at the price of reducing the HDT, which is undesired.

It is also known to carry out polymerization reactions in the presence of so-called chain transfer agents. The presence of chain transfer agents causes a so-called chain transfer reaction which can be represented as follows:

$$M\bullet_n + XQ \rightarrow M_nX + Q\bullet$$

where $M\bullet_n$ represents the growing polymer chain radical and XQ a chain transfer agent composed of atoms or groups X and Q. It is known in the art that chain transfer is an ubiquitous phenomenon in polymerization and almost any organic material is susceptible of reacting with the polymer radical and thus act as a chain transfer agent. The addition of a chain transfer agent lowers the molecular weight of PVC polymers and in this way decreases their processing torque, facilitating processibility. However, it is known that this decrease is at the expense of the strength, toughness, rigidity and chemical resistance, all of which are also lowered.

Thus, summing up the prior art, it is known (a) that the processing torque of vinyl chloride polymers can be reduced i.e., their flow characteristics can be improved, by copolymerizing vinyl chloride with ethylene, propylene, vinyl acetate, vinylidene chloride and the like which, however, causes a reduction of the HDT; (b) that some of such deficiencies of the copolymers can be overcome by branching, but this as well generally reduces the HDT; or (c) that the processing torque of PVC can be reduced by polymerization in the presence of a chain transfer agent, which, however, impairs the strength, toughness, rigidity and chemical resistance of the product.

In other words, in accordance with what has been previously known, any reduction of the processing torque was accompanied by undesired side effects which for many applications were prohibitive and no method has hitherto been known to produce vinyl chloride polymers of improved flow properties without a concomitant loss of some other essential property.

It is therefore an object of the present invention to provide new vinyl chloride polymers which on the one hand have a reduced processing torque, or in other words, a reduced melt viscosity and therefore improved processibility, at a relatively high molecular weight, while on the other hand the heat distortion temperature is not appreciably reduced as compared to PVC.

In accordance with the present invention it has surprisingly been found that it is possible to obtain polymers of vinyl chloride whose processing torque, i.e., flow properties under processing conditions, are superior to those of PVC while the HDT as well as other important physical characteristics are substantially the same as those of PVC, by carrying out the polymerization in the presence of at least one branching agent and at least one chain transfer agent as defined hereinafter.

The individual use of both chain transfer and branching agents is known from the art. The use of chain transfer agents to reduce molecular weight finds wide application in a large number of polymerization processes and requires no further comment here. The use of branching agents is also known to the art. Such materials are better known as cross-linking agents when used in concentrations sufficient to cross-link the individual polymer chains forming an infinite network and resulting in a material the processibility of which is related inversely to the degree of cross-linking. Such cross-linking agents contain at least two polymerizable double bonds and when used in concentrations below those sufficient to produce an infinite network they will introduce branch points into the polymer chain. When used under such conditions these materials are branching agents. Examples of the use of such materials for the PVC homopolymer are given in a series of patents by RH Martin (to Monsanto Inc.) U.S. Pat. Nos. 2,898,244, 2,996,486, 3,012,011, 3,043,814, 3,043,816, 3,047,549, 047,550 and others. The materials mentioned in these patents are claimed to improve the physical properties of vinyl chloride homopolymers when used in "minute but critical quantities". This technique has also been used to improve the properties of the vinyl chloride-propylene copolymers — U.S. Pat. Nos. 3,763,123, 3,806,496. It was however very surprising to find that by the combined use of judiciously chosen representatives of both the branching agents and the chain transfer agents a resin could be produced which exhibits markedly improved processability, yet has HDTs very similar to those of the PVC homopolymer.

Quite generally it could not have been anticipated in any way that by using in combination a branching agent and a chain transfer agent the desired results would be obtained, seeing that each by itself produces undesired results as specified above. This unpredictability is manifested, among others by the observation made in accordance with the invention that compounds known generally to act well as either branching agents or chain transfer agents, are not of equal utility in the context of the present invention and that consequently both the branching and chain transfer agents have to be selected from well defined groups. For example, triethylamine, with a much higher chain transfer coefficient than trichloroethylene, (Encyclopedia of Pol. Sci. Technology, Vol. 14, p. 332) would have been expected to perform better, but it has turned out that for the purpose of the present invention it is completely unsuitable. On the other hand, the low chain transfer coefficient reported for acetaldehyde in the same source would have led one to believe that aldehydes are not suitable. Contrary to this expectation it has been found that in practising the invention aldehydes are very suitable for fulfilling the chain transfer function. Still further, isopropyl substitution on benzene results in a higher chain transfer coefficient than that for acetaldehyde, yet such compounds are not suitable for the purposes of the present invention.

A further surprising observation made in accordance with the invention was that by using the selected branching and chain transfer agents at proper concentration the polymerization rate will not be appreciably affected.

SUMMARY OF THE INVENTION

In its process aspect, this invention relates to a process for the production of novel polymers from vinyl chloride, comprising preparing a charge containing (a) vinyl chloride; (b) from 50 ppm to 1% by weight of the total charge of at least one branching agent selected from the group of vinylic and allylic esters and amides and having at least two polymerizable double bonds in the molecule, in which branching agent the vinylic and allylic groups are linked directly to an ester oxygen or amide nitrogen atom, respectively; e.g., a member of the group consisting of triallyl cyanurate, diallyl phthalate and vinyl crotonate; (c) from 500 ppm to 5% by weight of at least one chain transfer agent selected from the group consisting of unsubstituted and substituted aliphatic aldehydes, $C_1$ and $C_2$ halogenated hydrocarbons containing 3 or 4 atoms of chlorine or bromine in the molecule, sulfides and mercaptans; and (d) at least one radical producing initiator; subjecting the charge to polymerization and recovering a polymer from the reaction mixture.

In its composition aspect, this relates to novel polymers of vinyl chloride thus produced.

DETAILED DISCUSSION

The new polymers according to the invention are significantly distinguished structurally from, for example, these disclosed in our U.S. Pat. Nos. 3,763,123 and 3,806,496 where each of the polymerizable components in the initial charge is to be found in the final polymer in quantities proportional to their contents in the reaction mixture, so that where, for example, the initial charge contains three components the same three components are to be found in the product, distributed throughout the polymeric chain.

In the process of this invention the reaction mixture also comprises at least three components, viz., vinyl chloride, a branching agent and a chain transfer agent. However, the chain transfer agent is not distributed throughout the polymer chain but is present in the product only in minute quantities as chain terminating component.

The novel polymers according to the invention have been found to have a lower torque and therefore better flow characteristics under processing conditions than PVC while at the same time their HDT is similar to that of PVC and may even be slightly higher. Thus in their physical properties the novel polymers are also significantly distinguished from and excel over all known vinyl chloride polymers, including those disclosed in our U.S. Pat. Nos. 3,763,123 and 3,806,496.

The HDT is closely related to the so-called Vicat temperatures and can thus be determined with good approximation by measurement with a Vicat instrument. Measurements conducted in accordance with the present invention have shown that for a given torque the Vicat temperatures of polymers according to the present invention are on an average about 10° C higher than those of known vinyl chloride-propylene resins. Quite generally, the polymers according to the invention have a better processability than the known ones without any sacrifice of:

a. molecular weight (as indicated by intrinsic viscosity);

b. Vicat temperatures or the HDT.

Thus the fulfillment of both these conditions at the same time, which for many applications is essential, has been attained for the first time in accordance with the present invention.

Hereinafter, the new vinyl chloride polymers of this invention will be referred to as low torque polyvinyl chloride and for short (LT-PVC).

The advantages of the LT-PVC of this invention as compared to homopolymeric PVC and VC-propylene copolymer is illustrated by the following Table I:

Table I

| Resin | I.V. | Brabender Torque (m-g) | Thermal Deformation Temp. (Vicat Temp.)° C |
|---|---|---|---|
| PVC | 0.83 | 1400 | 83 |
| VC-propylene | 1.11 | 1350 | 77 |
| LT-PVC | 0.98 | 1050 | 83 |

I.V. = intrinsic viscosity

From the data in Table I it follows that in comparison with PVC, the vinyl chloride-propylene copolymer in spite of its higher molecular weight has a significantly reduced Vicat temperature, whereas the LT-PVC has the highest processability as expressed in terms of Brabender Torque with no reduction of the Vicat temperature.

The substantial extent to which the flow properties of LT-PVC according to the invention are improved as compared to PVC is illustrated by the following example: The energy expressed in terms of the mixing torque as measured by a Brabender Plastograph, required to mix a molten LT-PVC according to the invention in which the chain branching agent (hereinafter CB) is triallyl cyanurate and the chain transfer agent (hereinafter CT) is pentaerythritol tetramercaptopropionate, is only 50% of that found for the unmodified PVC produced under similar conditions.

Furthermore, in practicing the present invention the polymerization process may be carried out batchwise, continuously or in steady state. The LT-PVC may be pigmented and filled employing fibrous or non-fibrous fillers. In addition they may comprise plasticizers, extenders, stabilizers, solvents, liquid fillers, gaseous fillers, binders and the like, e.g. of the kind employed with conventional PVC. The LT-PVC may be prepared in resinous compositions for molding, extrusion, milling, sintering, calendering, vacuum-forming, etc.

The superiority of the LT-PVC resins according to the invention is further illustrated by the following Table II:

Table II

Torques and Vicat Temperatures of some Resins

| Resin Type | CT%[a] | CB%[b] | Brabender Torque (m-g) | Vicat Temp. °C | IV dl/g |
|---|---|---|---|---|---|
| PVC | | | | | |
| 32369-43 | — | — | 1425 | 85 | 0.91 |
| Epivyl 32 | — | — | 1400 | 83 | 0.83 |
| Epivyl 46 | — | — | 2150 | 93 | 1.21 |
| Vinyl chloride-propylene copolymers | | | | | |
| Airco 401 | — | — | 1350 | 78 | 0.87 |
| Airco 405 | — | — | 1050 | 75 | 0.75 |
| Airco 420 | — | — | 900 | 74 | 0.66 |
| Airco 470 | — | — | 720 | 73 | 0.60 |
| Airco 480 | — | — | 530 | 70 | 0.58 |
| Vinyl chloride-propylene interpolymers | | | | | |
| Stauffer 323 | — | DAP[c] | 970 | 73 | 0.73 |
| Stauffer 324 | — | DAP[c] | 1015 | 73 | 0.92 |
| Stauffer 326 | — | DAP[c] | 1350 | 77 | 1.11 |
| LT-PVC | | | | | |
| 32369 - 45 TCE | 1.0% | TAC 0.06% | 1100 | 80 | 0.96 |
| 32369 - 47 TCE | 2.0% | TAC 0.08% | 900 | 80 | 0.87 |
| 32578 - 89 TCE | 3.5% | DAP 0.50% | 600 | 79 | 0.79 |
| 32369 - 55 DM | 0.2% | TAC 0.07% | 1025 | 83 | 0.98 |
| 32308 - 23 LM | 0.2% | TAC 0.04% | 1175 | 84 | 0.82 |
| 32597 - 63 LM | 0.2% | DAP 0.2 % | 1100 | 81 | 0.89 |
| 32308 - 25 PETMP | 0.4% | TAC 0.16% | 850 | 80 | 1.20 |
| 32597 - 7 PETMP | 0.35% | DAP 0.45% | 850 | 80 | 1.09 |
| 32369 - 87 PETTG | 0.4% | TAC 0.11% | 920 | 81 | 1.00 |
| 32597 - 3 PETTG | 0.4% | DAP 0.45% | 900 | 81 | 1.23 |
| 32308 - 109 LA | 1.0% | TAC 0.05% | 850 | 78 | 0.88 |
| 32578 - 5 PA | 1.0% | TAC 0.10% | 800 | 80 | 0.93 |
| 32597 - 75 PA | 1.0% | DAP 0.35% | 750 | 80 | 1.01 |
| 32597 - 63 BA | 1.0% | TAC 0.10% | 750 | 80 | 0.82 |
| 32597 - 53 BA | 1.0% | DAP 0.35% | 800 | 80 | 0.89 |

[a]TCE, trichloroethylene; DM, t-dodecylmercaptan; LM, lauryl mercaptan; PETMP, pentaerythritol tetramercaptopropionate; PETTG, pentaerylthritol tetrathioglycolate; LA, lauryl aldehyde; PA, pivaloyl aldehyde; BA, isobutyraldehyde. Concentrations on monomer charge.
[b]DAP, diallyl phthalate; TAC, triallyl cyanurate. Concentration is on monomer charge.
[c]Concentration unknown.

The choice of the particular CB and CT from among the above defined groups depends on the desired properties to be imparted to the final product and can be determined by simple experimentation on the basis of the teachings of this invention.

In practicing the present invention the polymerization is carried out by free radical initiation using known techniques. In cases the polymerization is carried out in aqueous dispersion, the CT and CB compounds should preferably be largely insoluble in water. The temperature may be varied within wide limits as is conventional with free radical initiated polymerization.

In accordance with one embodiment of practicing the invention the total amount of the vinyl chloride, CT and CB are incorporated in the initial charge. This, however, is not critical and thus in accordance with other embodiments either the CT or CB or even both may be added in part or completely at other stages of the process. It is also possible to add two or more CB and/or CT compounds.

In the above Table the designations Epivyl, Airco and Stauffer are trade names signifying resins procured from respectively Electrochemical Ind. (Frutarom) Ltd. of Israel, the Airco Corporation of USA and Stauffer Chemical Corporation of USA. Resins designated by the code numbers 32369, 32308, 32578 and 32597 with the addition of terminal digits are those produced by the Applicants. One such resin No. 32369-43 is conventional PVC while the remaining ones are all LT-PVC according to the invention.

It is seen from Table II that the Vicat temperatures of the LT-PVC resins are 78° C or higher whereas those of the conventional vinyl chloride-propylene copolymers and interpolymers are all 78° C or lower. Also, the Vicat temperatures of LT-PVC are very close to those of ordinary PVC, as are their intrinsic viscosities, while the torques of the LT-PVC's are significantly lower. Thus in one case of LT-PVC resin No. 32369-45 the Brabender torque is only 1100 m-g while that of the homopolymeric PVC Epivyl 46 is 2150 m-g, i.e. almost two times higher. Against this, when looking at the vinyl chloride-propylene copolymers it is seen that for comparable intrinsic viscosities the Brabender torque figures are indeed lower as desired but at the same time there occurs also a significant lowering of the Vicat temperature which imposes serious limitations on the applicability of these resins.

The advantages of the invention are shown in the accompanying drawing which is a graphical representation of the intrinsic viscosity - Brabender torque relationship for PVC, a conventional vinyl chloride-propylene copolymer and an LT-PVC according to the invention.

Vinyl chloride homo- and co-polymers are generally graded by their molecular weights as indicated by dilute solution viscosities such as the intrinsic viscosity. There is generally a direct relation between the intrinsic viscosity and the Brabender torque as illustrated for PVC and a conventional vinyl-propylene copolymer in the drawing. However, the materials produced according to the present invention introduce an additional degree of freedom by permitting independent variation of these two properties as shown in the drawing for LT-PVC. It follows therefrom, that within the designated area any desired combination of intrinsic viscosity - Brabender torque can be achieved. This effect was entirely unpredictable and cannot be achieved with PVC nor with conventional vinyl chloride copolymers and interpolymers.

The invention is further illustrated by the following Examples to which it is not limited.

EXAMPLE 1 - SUSPENSION POLYMERIZATION

Suspension polymerizations were carried out in a 1½ liter pressure reactor fitted with a rectangular blade stirrer operating at 500 rpm. A solution of suspending agent in deaerated distilled water was placed in this reactor, the initiator and the CB and CT compounds were added and the reactor was closed and flushed with nitrogen. Liquid vinyl chloride was introduced into the reactor. Stirring was started and the reactor was heated to 60° C. After eight hours the heating was stopped and the reactor was cooled while stirring. The excess gases were vented, the polymer removed, washed with distilled water and dried with air at 60° C by the fluidized bed technique. The following recipe was used:

| | |
|---|---|
| Vinyl chlorides | 310 g |
| Water | 620 g |
| Methocel (trademark, 90 Hg 100 cps, hydroxy-propylmethyl cellulose supplied by Dow) | 0.44 g |
| Tensaktol A (trademark, Na salt of di-decyl di sulphon-amide as 65% aqueous solution, supplied by BASF) | 0.1 g |
| Di lauroyl peroxide | as indicated |
| CB compound | " |
| CT compound | " |

Runs were carried out with triallyl cyanurate as CB and different CT compounds and the data of these runs are to be found in the following Table III.

Comparison blanks were run under identical conditions but with the exclusion of CB and/or CT compounds. The data are also included in Table III.

In the Table the numbers appearing under the heading "Experiment No" are Applicant's code numbers unless otherwise stated.

Table III

| | | | | | | Brabender results | | |
|---|---|---|---|---|---|---|---|---|
| Experiment No. | CT % | CB % Triallyl Cyanurate | DLP[a] % | Yield % | IV dl/g | torque m-g | time to degrade minutes | Vicat[b] Temp. ° C |
| 32369-43 | — | — | 0.16 | 90 | 0.91 | 1425 | 12 | 85 |
| 32193-79 | — | — | 0.33 | 89 | 0.94 | 1250 | 8.5 | |
| E 32 (PVC:commercial) | | | | | 0.83 | 1400 | 16 | 83 |
| SCC 323[c] | | | | | 0.73 | 970 | 26 | 73 |
| SCC 324[c] | | | | | 0.92 | 1015 | 19 | 73 |
| SCC 326[c] | | | | | 1.11 | 1350 | 15 | 77 |
| 32308-25 | — | 0.04 | 0.16 | 88 | 1.17 | 1600 | 13 | |
| 32308-109 | lauryl aldehyde, 1% | 0.05 | 0.33 | 91 | 0.88 | 850 | 14 | 78 |
| 32369-45 | trichloroethylene, 1% | 0.06 | 0.16 | 90 | 0.96 | 1100 | 12 | 80 |
| 32362-21 | lauryl mercaptan, 0.4% | 0.10 | 0.33 | 78 | 0.95 | 950 | 17 | |
| 32369-55 | t-dodecyl mercaptan, 0.2% | 0.07 | 0.33 | 74 | 0.98 | 1025 | 19 | 83 |
| 32369-23 | t-dodecyl mercaptan, 0.4% | 0.12 | 0.33 | 63 | 0.95 | 900 | 30 | 84 |
| 32152-33 | pentaerythritol tetrathioglycolate, 0.3% | 0.04 | 0.33 | 73 | 0.68 | 900 | 22 | |
| 32308-29 | pentaerythritol tetramercaptopropionate, 0.4% | 0.12 | 0.33 | 84 | 0.86 | 900 | 17 | 80 |

[a]DLP is dilauryl peroxide
[b]ASTM D1525
[c]Vinyl chloride-propylene interpolymers ex Stauffer It is seen from the foregoing Table III that at equivalent or even higher intrinsic viscosity, the torques of the samples LT-PVC prepared in accordance with the invention the presence of CB and CT are lower than both the homo- and inter-polymer prepared under comparable conditions. A lower torque signifies a decreased melt viscosity and hence the LT-PVC according to the invention shows improved flow and stability as compared to the homo-polymer.

EXAMPLE 2 - BULK POLYMERIZATION

In each of a number of glass pressure tubes which had been swept with nitrogen, a charge of monomer is introduced comprising in admixture vinyl chloride, a CB compound, a CT compound and an initiator. After introduction of the charge, each tube is again swept with nitrogen, closed and polymerization is performed under head-over-head tumbling of the tubes in a water bath at 60° C, giving precipitation polymerization. After completion of the reaction the mixture is cooled, traces of residual monomer are vented and the polymer removed from the tube. Two experiments were conducted with different mixtures and two blank tests were run, one with a charge not including CB and CT compounds, and the other with a charge containing only a CB compound. The results are given in the following Table IV. The 119 series experiments with both CT and CB compounds had much improved flow properties compared to the series 135 which were prepared under the same conditions.

Table IV

| Experiment No. 32369 | CT Compound | %CB[b] | Bulk Runs[a] Brabender Torque mg | IV (dl/g) |
|---|---|---|---|---|
| 119-B | chloralhydrate, 2% | 0.07 | 850 | 0.72 |
| 119-C | propionaldehyde, 2% | 0.07 | 600 | 0.55 |
| 135-B | — | — | 1400 | 0.84 |
| 135-A | — | 0.07 | 1500 | 1.35 |

[a] all runs with 0.16% lauryl peroxide
[b] triallyl cyanurate

We claim:

1. In a process for the production of thermoplastic vinyl chloride polymers having a Vicat temperature of at least 78° C. and improved flow characteristics, by free radical initiated polymerization of a mixture of monomers consisting of (a) vinyl chloride and (b) a monomer copolymerizable therewith the improvement which comprises employing as (b) from 50 ppm to 1% by weight of the mixture of at least one chain branching agent selected from the group consisting of triallyl cyanurate diallyl phthalate and vinyl crotonate, and conducting the polymerization in the presence of from 500 ppm to 5% by weight of the mixture of at least one chain transfer agent selected from the group consisting of unsubstituted and substituted aliphatic aldehydes, unsubstituted and substituted mercaptans, and $C_1$ and $C_2$ hydrocarbons containing 3 or 4 atoms of chlorine or bromine in the molecule.

2. A process according to claim 1 wherein the polymerization is a suspension polymerization.

3. A process according to claim 1 wherein the polymerization is a bulk polymerization.

4. A process according to claim 1 wherein the chain transfer agent is trichloroethylene.

5. A process according to claim 1 wherein the chain transfer agent is selected from the group consisting of lauryl aldehyde, pivaloyl aldehyde, isobutyraldehyde, propionaldehyde and chloralhydrate.

6. A process according to claim 1 wherein the chain transfer agent is selected from the group consisting of t-dodecyl-mercaptan, lauryl mercaptan, pentaerythritol tetrathioglycolate and pentaerythritol tetramercaptopropionate.

7. A process according to claim 1 wherein the chain branching is triallyl cyanurate.

8. A process according to claim 4 wherein the chain branching agent is triallyl cyanurate.

9. A process according to claim 5 wherein the chain branching agent is triallyl cyanurate.

10. A process according to claim 6 wherein the chain branching agent is triallyl cyanurate.

11. A process according to claim 10 wherein (c) is pentaerythritol tetramercaptopropionate.

12. A thermoplastic vinyl chloride copolymer having a heat distortion temperature comparable to PVC homopolymer but lower torque and better process flow characteristics, produced according to the process of claim 1.

13. A thermoplastic vinyl chloride copolymer having a heat distortion temperature comparable to PVC homopolymer but lower torque and better process flow characteristics, produced according to the process of claim 7.

* * * * *